F. WINSLOW,

Assignor, by mesne assignments, to himself as trustee of THE NAUMKEAG BUFFING MACHINE ASSOCIATION.

Boot and Shoe Sole Buffer.

No. 9,752. Reissued June 14, 1881.

Witnesses.

Henry Chadbourn.

Samuel W. Torrey

Inventor.

Freeman Winslow.

by Alban Andrew his atty

UNITED STATES PATENT OFFICE.

FREEMAN WINSLOW, OF SALEM, MASSACHUSETTS, ASSIGNOR, BY MESNE ASSIGNMENTS, TO HIMSELF AS TRUSTEE OF THE NAUMKEAG BUFFING MACHINE ASSOCIATION.

BOOT AND SHOE SOLE BUFFER.

SPECIFICATION forming part of Reissued Letters Patent No. 9,752, dated June 14, 1881.

Original No. 190,174, dated May 1, 1877. Application for reissue filed May 9, 1881.

*To all whom it may concern:*

Be it known that I, FREEMAN WINSLOW, of Salem, in the county of Essex and State of Massachusetts, have invented a new and useful or Improved Shoe-Sole Buffer; and I do hereby declare the same to be described in the following specification and represented in the accompanying drawings, of which—

Figure 1:
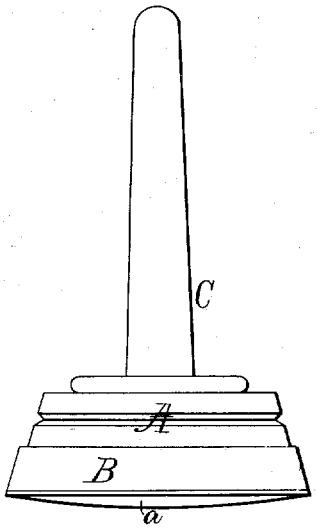
Figure 2:
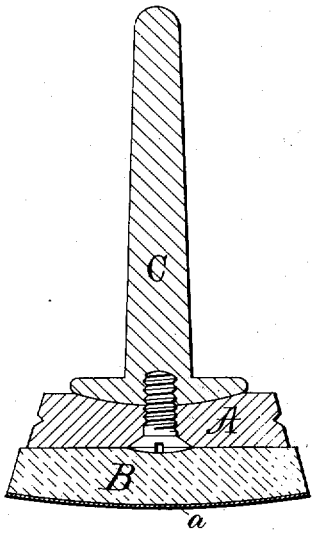
Figure 3:
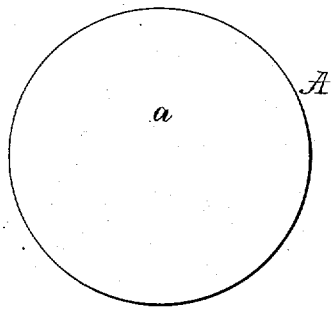

Figure 1 is a side view, Fig. 2 a longitudinal section, and Fig. 3 an end view, of it.

The finishing of a shoe-sole at or near the vertex of the angle of the shank and heel, as heretofore practiced, requires to be done with great care, especially in order not to injure or deface the front edge of the heel.

The object of my invention is to enable such to be readily and thoroughly and more expeditiously effected.

The invention is carried out as follows:

A is a disk or conic frustum of wood, to which a thick disk or conic frustum or cushion, B, of felt, is not only glued, cemented, or fastened, but covered on its outer side with sandpaper *a*, or other suitable buffing or abrasive material, the periphery of the felt being entirely without any such covering. The buffer so made is usually secured to or screwed to a metallic shank, C, for fixing it to a rotary shaft or a bar.

It will be seen, by reference to the drawings, that the elastic abrasive circular pad B is extended laterally all around and projects beyond its holder A, for the purpose of allowing the said elastic circular pad to yield upward toward or against the side of its holder during the revolution of the latter, by which arrangement said pad can be used to much better advantage than pads of that nature which are made of the same size with the rigid or unelastic base or bottom of its holder, to which it is secured, and by making the elastic pad B extended laterally all around its holder A, I am able to reach and scour all parts of the soles of boots and shoes, and particularly the hollow of the shanks thereof, as well as the junction of the sole and heel, without defacing or injuring the latter, in a more effectual manner than could be accomplished with the other kinds of pads above referred to.

In using the buffer while it may be in rapid revolution its abrasive surface is to be brought and borne in contact with the shoe-sole shank, and to be moved across it near and up to its junction with the front edge of the heel. The elastic property of the felt will allow of the abrasive covering being carried in close contact with the surface to be finished and up to the heel without danger or injury to or defacement of it. It also causes the abrasive surface to readily adapt itself to the varying curved surface to be buffed or finished by it.

I claim—

1. The rotary shoe-sole buffer, substantially as described, composed of the supporting wooden conic frustum A, and the felt disk or conic frustum B and its abrasive covering *a*, arranged and applied essentially as set forth.

2. The combination of the shank C, the wooden frustum A, the felt frustum B, and the abrasive covering *a*, all arranged and applied substantially as shown and described.

3. A boot or shoe sole buffer consisting of the shank C, holder A, and elastic circular pad B, extended laterally in a radial direction beyond the holder and provided with an abrasive covering, *a*, as and for the purpose set forth.

FREEMAN WINSLOW.

Witnesses:

E. J. TORREY,

ALBAN ANDRÉN.